(12) United States Patent
Agoston et al.

(10) Patent No.: US 12,545,000 B1
(45) Date of Patent: Feb. 10, 2026

(54) BALE WEIGHING SYSTEM

(71) Applicant: Marathon Equipment Company, South Vernon, AL (US)

(72) Inventors: Bradley Michael Agoston, Fayette, AL (US); Daniel Robert Overstreet, Caledonia, MS (US); Jeremy Wayne Woodruff, Fayette, AL (US)

(73) Assignee: Marathon Equipment Company, South Vernon (AL)

( * ) Notice: Subject to any disclaimer, the term of this patent is extended or adjusted under 35 U.S.C. 154(b) by 219 days.

(21) Appl. No.: 18/311,176

(22) Filed: May 2, 2023

Related U.S. Application Data

(60) Provisional application No. 63/337,455, filed on May 2, 2022.

(51) Int. Cl.
*B30B 9/30* (2006.01)
*B30B 15/04* (2006.01)
*G01G 3/14* (2006.01)
*G01G 19/52* (2006.01)

(52) U.S. Cl.
CPC ............ *B30B 9/3003* (2013.01); *B30B 15/04* (2013.01); *G01G 3/14* (2013.01); *G01G 19/52* (2013.01)

(58) Field of Classification Search
CPC ....... B30B 9/30; B30B 9/3032; B30B 9/3003; B30B 9/3046; B30B 15/04; B30B 15/0094; G01G 3/14; G01G 19/52; B65F 1/1405
See application file for complete search history.

(56) References Cited

U.S. PATENT DOCUMENTS

| | | |
|---|---|---|
| 3,499,500 A | 3/1970 | Harding |
| 3,880,072 A | 4/1975 | Ord |
| 3,893,386 A | 7/1975 | Wise |
| 4,095,660 A | 6/1978 | Johansson |
| 4,258,810 A | 3/1981 | Susor |
| 4,478,091 A | 10/1984 | Forrester |
| 4,516,646 A | 5/1985 | Bergfalk |

(Continued)

FOREIGN PATENT DOCUMENTS

| | | | |
|---|---|---|---|
| CA | 2788515 A1 | 2/2014 | |
| DE | 102016107875 A1 * | 11/2017 | ............... B30B 9/30 |
| EP | 0392842 A1 | 10/1990 | |

OTHER PUBLICATIONS reenerecycling.com.com [online], "Services—Greene Recycling_Recycling Card/Cardboard/," Jun. 18, 2024, retrieved on Sep. 11, 2025, retrieved from URL <https://greenerecycling.com/services/>, 7 pages.

(Continued)

*Primary Examiner* — Jimmy T Nguyen
(74) *Attorney, Agent, or Firm* — Fish & Richardson P.C.

(57) ABSTRACT

A baling system includes a baler and an anchor. The baler includes a baler base with a laterally-extending flange; a waste container adapted to hold a quantity of material to be baled; a compression ram positioned to compress material within the waste container to form a bale; and a scale responsive to a weight of the waste container, the ram, and material in the waste container. The anchor is adapted to constrain movement of the baler with respect to a support surface on which the baler rests. The anchor defines a recess adapted to receive a structural feature of the baler base spaced laterally from the scale.

21 Claims, 12 Drawing Sheets

(56) References Cited

U.S. PATENT DOCUMENTS

| | | | |
|---|---|---|---|
| 4,694,921 A | 9/1987 | Johnston | |
| 4,728,241 A | 3/1988 | Edelhoff | |
| 4,742,880 A | 5/1988 | Schrag et al. | |
| 4,773,027 A | 9/1988 | Neumann | |
| 5,016,197 A | 5/1991 | Neumann et al. | |
| 5,174,198 A | 12/1992 | Bolstad | |
| 5,350,493 A | 9/1994 | Nguyen | |
| 5,359,153 A * | 10/1994 | Herrmann | G01G 21/22 177/126 |
| 5,384,436 A | 1/1995 | Pritchard | |
| 5,742,010 A | 4/1998 | Griffin | |
| 5,770,823 A | 6/1998 | Piroozmandi | |
| 6,155,769 A | 12/2000 | Robinson | |
| 6,230,142 B1 | 5/2001 | Benigno | |
| 6,360,186 B1 | 3/2002 | Durbin | |
| 6,378,276 B1 | 4/2002 | Dorge et al. | |
| 6,525,276 B1 | 2/2003 | Vellidus | |
| RE38,233 E | 8/2003 | Vande Berg | |
| 6,769,315 B2 | 8/2004 | Stevenson | |
| 6,787,713 B2 | 9/2004 | Kuechenmeister | |
| 7,119,287 B2 * | 10/2006 | Kroll | G01G 19/027 177/DIG. 9 |
| 7,146,294 B1 | 12/2006 | Waitkus, Jr. | |
| 7,166,229 B2 | 1/2007 | Cote | |
| 7,406,402 B1 | 7/2008 | Waitkus | |
| 7,511,234 B1 | 3/2009 | Ebinger | |
| 7,683,274 B2 | 3/2010 | Dellac | |
| 8,238,898 B2 | 8/2012 | Lerner | |
| 8,674,243 B2 | 3/2014 | Curotto | |
| 8,919,210 B2 | 12/2014 | Kjar | |
| 9,188,476 B2 | 11/2015 | Volker | |
| 9,347,818 B2 | 5/2016 | Curotto | |
| 9,612,150 B2 * | 4/2017 | Perrea | G01G 23/005 |
| 9,651,413 B2 | 5/2017 | Jaeger | |
| 10,718,657 B2 | 7/2020 | Vasconcelos | |
| 10,768,042 B2 | 9/2020 | Zhang | |
| 2006/0080819 A1 | 4/2006 | McAllister | |
| 2007/0068238 A1 | 3/2007 | Wendte | |
| 2007/0175341 A1 | 8/2007 | Roberts | |
| 2007/0185612 A1 | 8/2007 | Stevens et al. | |
| 2008/0061125 A1 | 3/2008 | Langlois et al. | |
| 2009/0235628 A1 | 9/2009 | Derstine et al. | |
| 2010/0179912 A1 | 7/2010 | Curotto | |
| 2010/0304672 A1 | 12/2010 | Lerner | |
| 2012/0073456 A1 | 3/2012 | Lyle | |
| 2012/0152133 A1 | 6/2012 | Newsome, III | |
| 2012/0285750 A1 | 11/2012 | Hynes | |
| 2014/0122347 A1 | 5/2014 | Moran et al. | |
| 2014/0156541 A1 | 6/2014 | Waite et al. | |
| 2015/0013579 A1 | 1/2015 | Mariman | |
| 2016/0356640 A1 | 12/2016 | Freeman | |
| 2017/0211969 A1 | 7/2017 | Waite et al. | |
| 2018/0340813 A1 | 11/2018 | Cowles | |
| 2018/0364093 A1 | 12/2018 | Vasconcelos | |
| 2019/0224935 A1 * | 7/2019 | Waite | B65F 1/1405 |
| 2019/0293478 A1 | 9/2019 | Waite et al. | |
| 2020/0164608 A1 | 5/2020 | Waite et al. | |
| 2020/0323169 A1 * | 10/2020 | Hogan | G01G 17/00 |

OTHER PUBLICATIONS wastecare.com.com [online], "60" Vertical Balers Comparison Chart, Aug. 13, 2024, retrieved on Sep. 11, 2025, retrieved from URL <https://wastecare.com/Products-Services/Balers/Balers_Large_Vertical_Balers_60_inch.htm>, 5 pages.

* cited by examiner

BALE WEIGHING SYSTEM

CROSS-REFERENCE TO RELATED APPLICATION

This application claims the benefit under 35 U.S.C. § 119 (e) of U.S. Patent Application No. 63/337,455, entitled "Bale Weighing System," filed May 2, 2022, which is incorporated herein by reference in its entirety.

TECHNICAL FIELD

This disclosure generally relates to compactor devices, and more particularly to vertical balers configured to compress and weigh materials.

BACKGROUND

Various compactor devices (e.g., balers) for compacting waste materials (e.g., refuse such as cardboard, paperboard, or the like) exist in the art. These compactor devices generally include a housing defining a compaction chamber, a closable door, and a compacting device (e.g., a hydraulically-powered ram) that is actuated to perform a compaction cycle in the compaction chamber. It is often desired to know the weight of a bale of material. Some systems have been proposed for determining the weight of a bale while still in the baler, but further improvements are sought.

SUMMARY

In general, this disclosure relates to baling systems that include a baler and a weighing system further including a scale.

One aspect of the present disclosure features a baling system including: a baler including: a baler base with a laterally-extending flange; a waste container adapted to hold a quantity of material to be baled; a compression ram positioned to compress material within the waste container to form a bale; and a scale responsive to a weight of the waste container, the ram, and material in the waste container; and an anchor adapted to constrain movement of the baler with respect to a support surface on which the baler rests, wherein the anchor defines a recess adapted to receive a structural feature of the baler base spaced laterally from the scale.

Embodiments may include one or more of the following features.

In some embodiments, the anchor has: i) a vertical portion defining the recess and adapted to couple with the structural feature in a transverse direction, and ii) a horizontal portion that is adapted to rest on the support surface.

In some embodiments, the vertical and horizontal portions are integrally formed as a unitary component.

In some embodiments, the horizontal portion extends laterally under the scale.

In some embodiments, the horizontal portion is rigidly secured to the support surface at one or more mounting points.

In some embodiments, the anchor is an L-shaped plate.

In some embodiments, the structural feature is a portion of the flange.

In some embodiments, the baling system further includes a processor operatively connected to the scale and configured to receive and transmit data output from the scale.

In some embodiments, the data output is the weight of the waste container, the ram, and/or the material in the waste container.

In some embodiments, the baling system further includes a user interface configured to present the data output of the scale to a user.

In some embodiments, the baler is a vertical baler.

In some embodiments, the scale includes a shear beam load cell having a first end extending over and rigidly secured to the flange, and a second end supported on a foot resting on the support surface.

In some embodiments, the horizontal portion extends laterally under the scale, and the foot is configured to further rest on the horizontal portion of the anchor.

In some embodiments, the scale further includes a second shear beam load cell extending over and rigidly secured to a second flange, and a third end supported on a foot resting on the support surface, wherein the shear beam load cell is a first shear beam load cell, and wherein the anchor extends between the first and second shear beam load cells.

In some embodiments, the shear beam load cell is rigidly secured to the flange by one or more retainers.

In some embodiments, the baling system further includes a stand having a pair of opposing, lateral walls and opposing top and base walls, the base wall adapted to rest on the support surface.

In some embodiments, the flange defines a wall recess adapted to receive a wall of the pair of opposing, lateral walls of the stand.

In some embodiments, the scale includes an S-type load cell having a first end mounted on and rigidly secured to the flange, and a second end rigidly secured to the stand.

In some embodiments, the second end of the S-type load cell is rigidly secured to the top wall of the stand.

In some embodiments, the scale further includes a second S-type load cell extending over and rigidly secured to a second flange, and a third end supported on a foot resting on the support surface, wherein the S-type load cell is a first shear beam load cell, and wherein the anchor extends between the first and second S-type load cells.

In some embodiments, the S-type load cell is rigidly secured to the flange and the stand via one or more retainers.

Some embodiments of the systems and devices described below may provide one or more of the following advantages. Some embodiments described below may feature an anchor adapted to receive a structural feature of a baler spaced laterally from a scale of the baler. For example, some embodiments described below may feature an anchor defining a recess adapted to receive the structural feature (e.g., a flange of a baler base) of the baler. Such lateral spacing, with respect to the scale, of the anchor-baler engagement point may simplify installation of anchor and/or weighing systems on existing balers. For example, an existing baler may be easily retrofitted with the anchors and scales disclosed herein. Furthermore, the lateral spacing of the anchor engagement point may prevent inadvertent damage to scales (e.g., load cells) from unexpected anchor shifting or contact during setup. Some embodiments described below may feature an anchor that may prevent lateral loading of the scale (e.g., a load cell) that may damage the scale if the baler is bumped, such as by a forklift.

Additionally, the anchors described below may help to prevent transferring any tilting or torsional loads from the anchor through a baler base to the load cell. The embodiments described below may also allow a more precise fitment of the anchor to the baler base in cases where the anchor is to limit load cell displacement in the event of overloading. In addition, the recess defined by the anchor and adapted to receive the structural feature (e.g., a flange of a baler base) of the baler may allow the anchor plate to be slid horizontally onto the flange of the baler base and may allow the anchors to be completely removed without disturbing the scales (e.g., load cells), such that that the baler may be easily moved from one place to another if needed.

Furthermore, various aspects of the embodiments described below provide baling systems including an anchor that can provide support and stability to the scale(s) of the balers. The added support and stability may mitigate or completely prevent lateral movement or sliding of the scale(s), thereby improving the weight measurement accuracy and overall performance of the weighing system.

In addition, the embodiments described below provide baling systems including configurations that advantageously provide an operator easy access to the scale(s) of the baler, thereby facilitating installation and/or removal of a scale, if necessary (e.g., if a scale fails and requires replacement).

The details of one or more embodiments of the invention are set forth in the accompanying drawings and the description below. Other features, objects, and advantages of the invention will be apparent from the description, the drawings, and the claims.

DESCRIPTION OF DRAWINGS

Like reference symbols in the various drawings indicate like elements.

DETAILED DESCRIPTION

Embodiments described below include baling systems featuring a compactor device (e.g., a vertical baler) including a scale and an anchor. In some embodiments, the scale is part of a weighing system that is configured to measure a weight of a waste container of the baler, a compression ram, and/or material in the waste container.

Figure 1A:
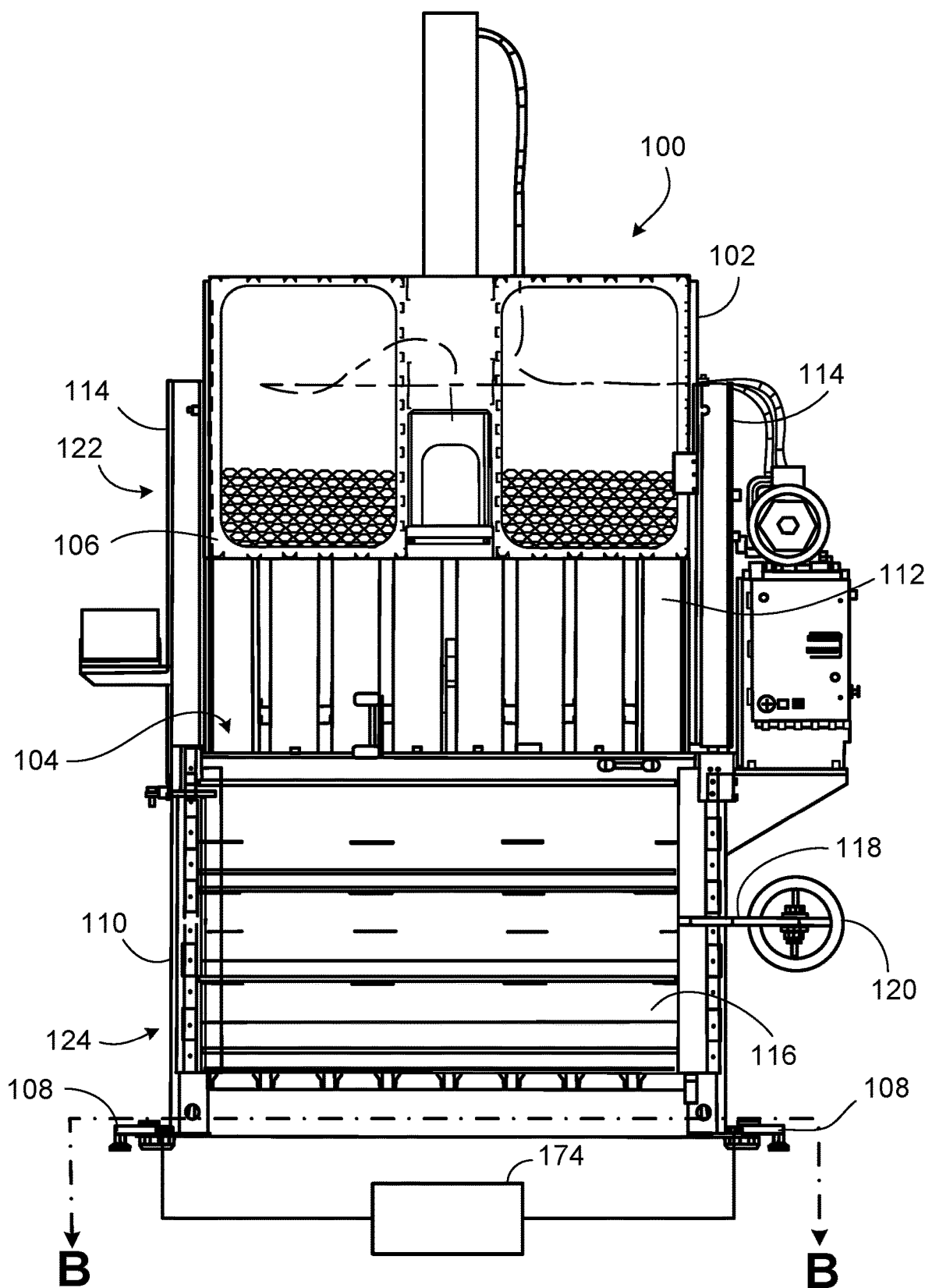
FIG. 1A is a front view of a first baling system including a baler and a scale.

FIG. 1A is a front view of an exemplary baling system 100 including a baler 102 (e.g., a vertical baler) and a scale 108. The baler 102 includes a compression ram 106 that is configured to compact material, such as recyclable material, refuse, or the like. The baler 102 includes a frame 110 having a back wall 112 extending orthogonally between a pair of opposing side walls 114. The baler 102 further includes a bale door 116 having a first edge that is pivotably coupled to the frame 110 via a hinge and a second edge that is hingedly coupled to the frame 110 by a turnbuckle latch 118. A user can open and close the turnbuckle latch 118, and consequently unlock and lock the bale door 116, by rotating a wheel 120. The back wall 112, opposing side walls 114, and the bale door 116 (when in a closed position) together define a waste container 104 or compaction chamber. The waste container 104 is adapted to hold a quantity of material to be baled. The compression ram 106 is positioned within the baler 102 to compress material within the waste container 104 to form a bale. For example, the compression ram 106 is configured for vertical travel, between a first end 122 and a second end 124 of the baler 102, within the waste container 104, to compact material contained within the waste container 104.

Figure 1B:
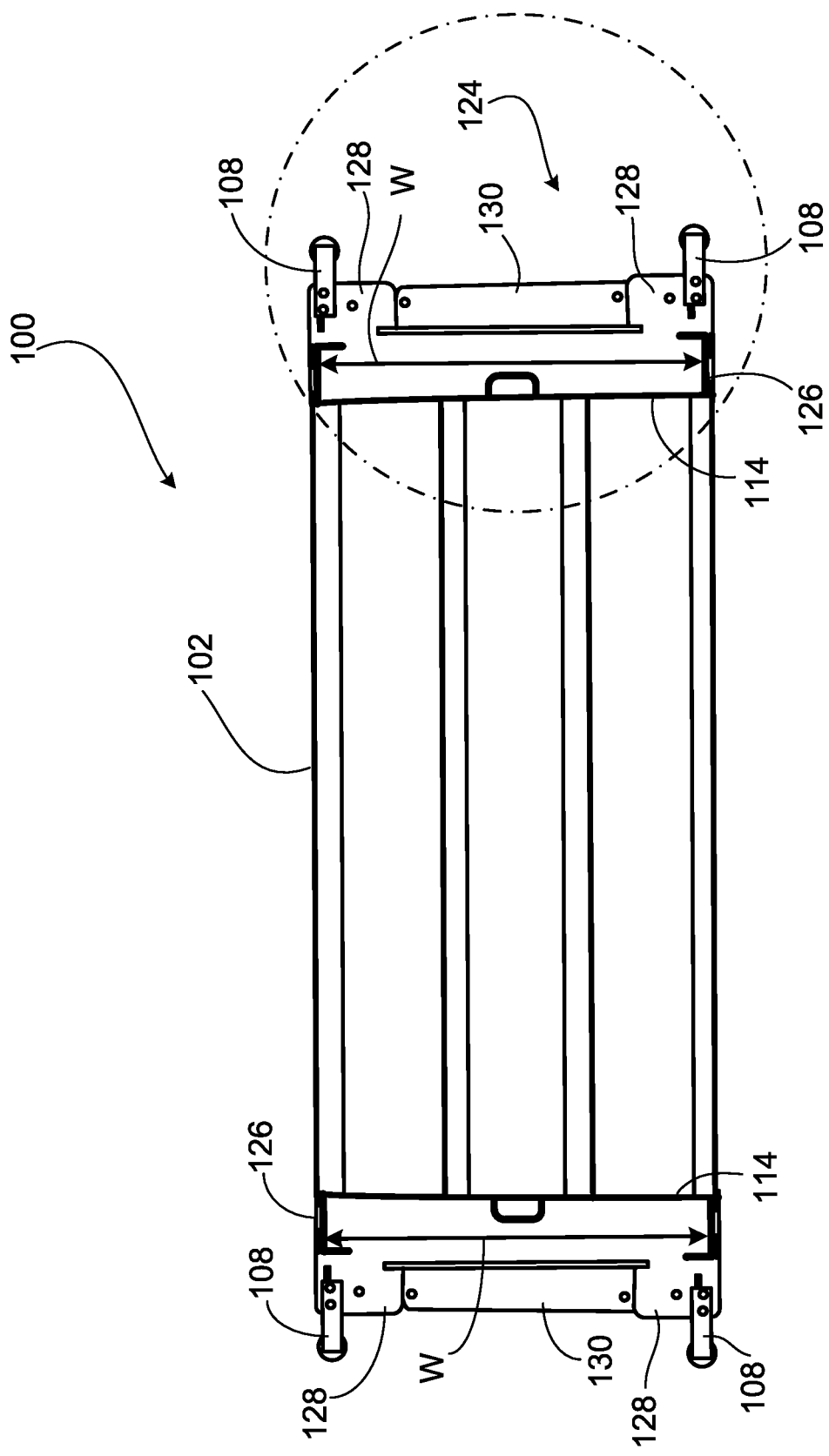
FIG. 1B is a top cross-sectional view of the baling system of FIG. 1A taken along the line B-B of FIG. 1A.

FIG. 1B is a top cross-sectional view of the baling system 100 through line B-B of FIG. 1A. As shown in FIG. 1B, the baler 102 includes a baler base 126 that is configured to support the baler 102. The baler base 126 extends along the width w of each side wall 114 at the second end 124 of the baler. The baler base 126 includes a laterally-extending flange 128 protruding from each corner of the baler base 126. The flange 128 is substantially rectangular in shape. The flanges described herein are merely exemplary and not intended to limit the present disclosure in any way. Other embodiments are contemplated to be within the scope of the present disclosure. For example, other contemplated embodiments include a baler base having a flange of any suitable size and shape (e.g., circular or polygonal) is contemplated in the disclosure. The baler base 126 and the flange 128 are typically made of one or more materials that have mechanical properties such as hardness and toughness that allow the baler base 126 and flange 128 to withstand friction, abrasion, absorb energy without fracturing and/or rupturing, and support the baler 102. Exemplary materials from which the baler base 126 and flange 128 are typically made include steel (e.g., stainless steel, cold-rolled steel, or the like).

Figure 2:
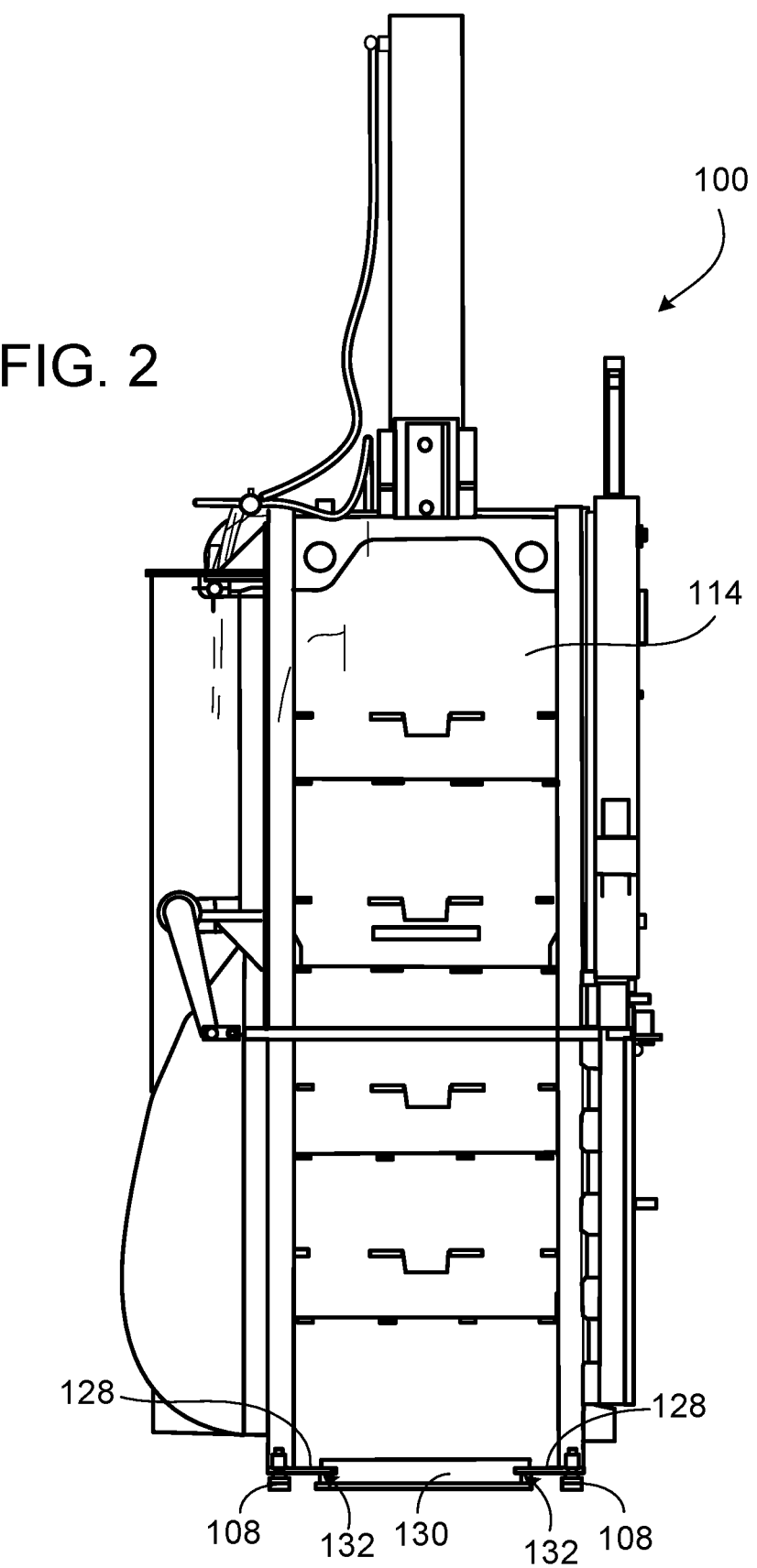
FIG. 2 is a side view of the baling system of FIGS. 1A and 1B.

Referring to FIG. 2, and also shown in FIG. 1B, the baling system 100 further includes an anchor 130 adapted to constrain movement of the baler 102 with respect to a support surface (e.g., a ground surface) on which the baler 102 rests. The anchor 130 extends between the pair of flanges 128, along each side wall 114 on each side of the baler 102. Additionally, the anchor 130 extends between the pair of scales 108 on each side of the baler 102. The anchor 130 defines a recess 132 on each end of the opposing ends of the anchor 130. Thus, the anchor 130 is adapted to receive a structural feature (e.g., a portion of the flange 128) of the baler base 126 spaced laterally from the scale 108. In some embodiments, the anchor 130 can help stabilize and prevent lateral and/or longitudinal movement by engaging with an edge and/or surface of the flange 128.

Figure 3:
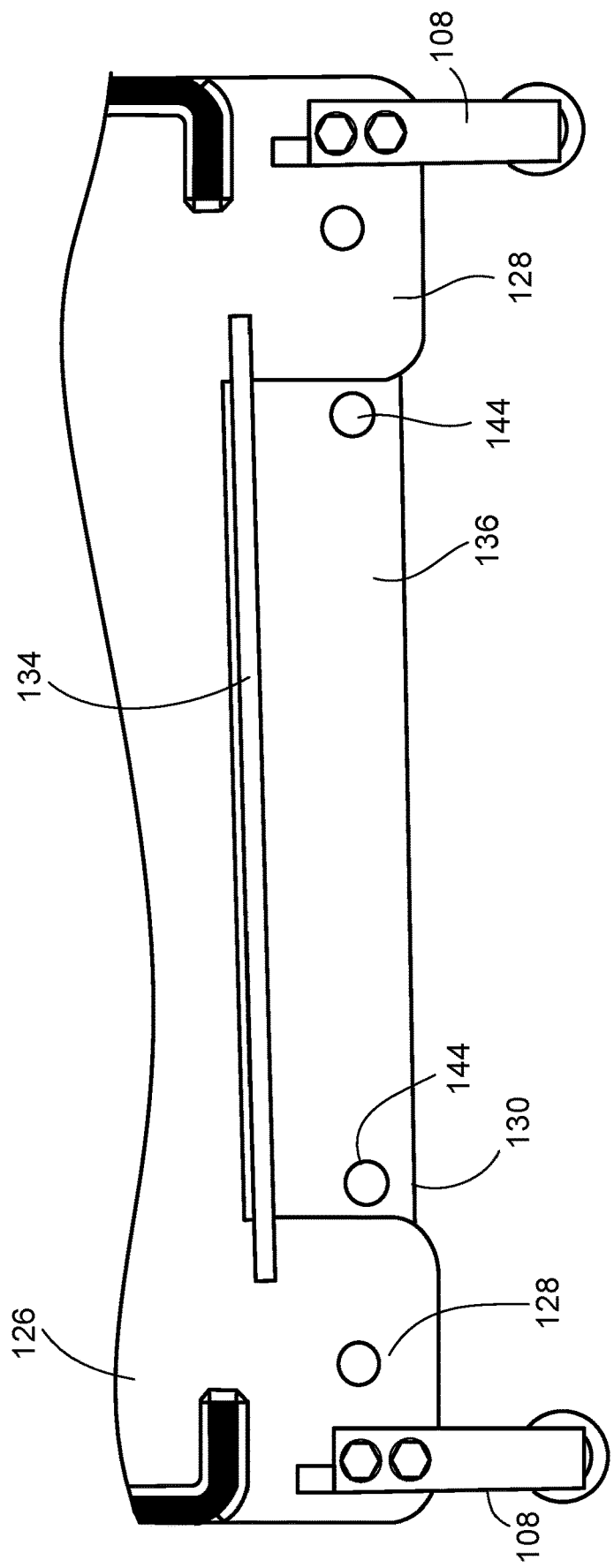
FIG. 3 is an enlarged, top partial view of a baler base of the baling system of FIGS. 1A and 1B.
Figure 4:
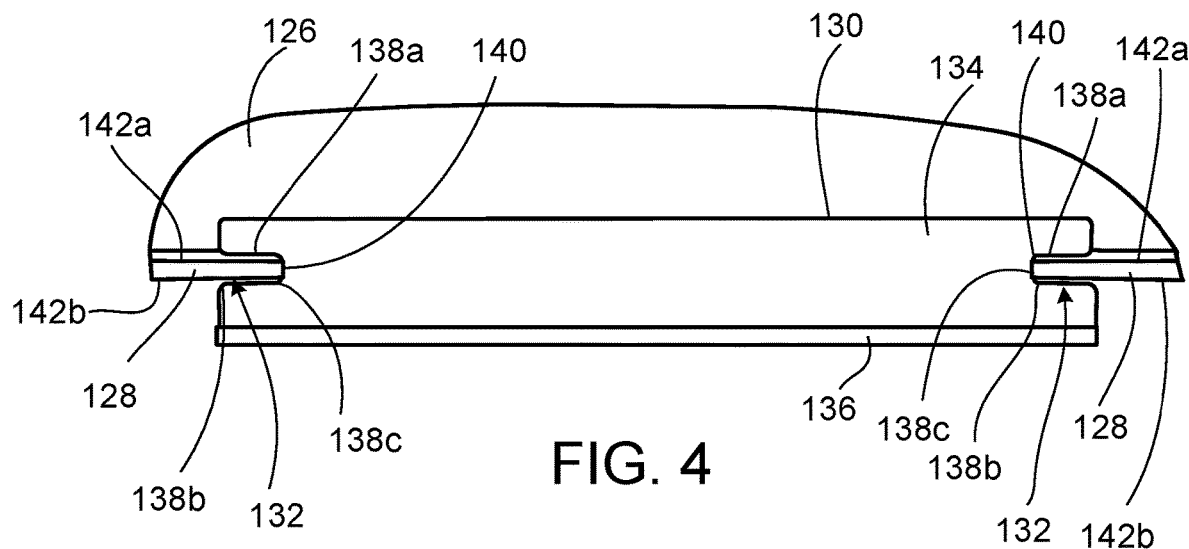
FIG. 4 is an enlarged, side partial view of a baler base.

Referring to FIGS. 3 and 4, the anchor 130 is an L-shaped plate having a vertical portion 134 and horizontal portion 136. The vertical and horizontal portions 134, 136 are positioned perpendicularly with respect to one another. The vertical and horizontal portions 134, 136 are integrally formed as a unitary component. The vertical portion 134 of the anchor 130 defines the recess 132, which is adapted to couple with the structural feature (e.g., a portion of the flange 128) of the baler base 126 in a transverse direction. In addition, the horizontal portion 136 of the anchor 130 is adapted to rest on the support surface on which the baler rests. In some embodiments, the horizontal portion 136 extends laterally under the scale 108 to provide further support and stability (e.g., to prevent any lateral movement or sliding of the scale 108) to the scale 108. The horizontal portion 136 is configured to be rigidly secured to the support surface at one or more mounting points 144. The horizontal portion 136 defines two mounting points 144 at opposing ends of the horizontal portion 136 of the anchor 130. In some embodiments, the mounting points 144 are through-holes configured to receive a retainer. In some embodiments, the horizontal portion 136 is rigidly secured to the support surface at two mounting points 144 by a retainer (e.g., any suitable bolt or screw fastener that is rigid enough to secure the anchor 130 and resist deformation).

The recess 132 is U-shaped and is defined by opposing first and second surfaces 138a, 138b connected by a third surface 138c. In some embodiments, when receiving the structural feature (e.g., a portion of the flange 128) of the baler base 126, a side edge 140 of the structural feature (e.g., a portion of the flange 128) contacts the third surface 138c of the recess 132. The structural feature (e.g., a portion of the flange 128) has a top surface 142a and a bottom surface 142b that extend orthogonally with respect to the vertical portion 134 of the anchor 130 when received by the recess 132. In some embodiments, when the structural feature (e.g., a portion of the flange 128) is received by the recess 132, a portion of the top surface 142a of the structural feature contacts the first surface 138a of the recess 132. In some embodiments, when the structural feature (e.g., a portion of the flange 128) is received by the recess 132, a portion of the bottom surface 142b of the structural feature contacts the second surface 138b of the recess 132. In some embodiments, a portion of the bottom surface 142b of the structural feature contacts the second surface 138b of the recess 132 when the baler 102 has reached a maximum weight.

Figure 5A:
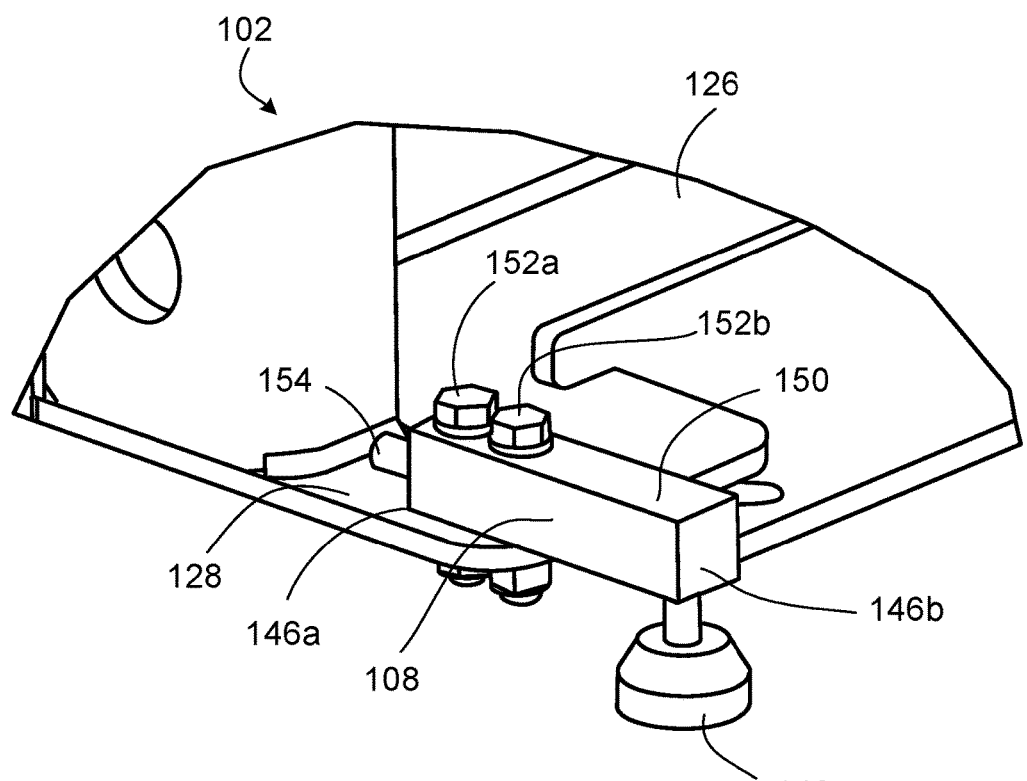
FIGS. 5A, 5B, and 5C are enlarged perspective, side, and top partial views, respectively, of a scale of the baling system of FIGS. 1A and 1B.
Figure 5B:
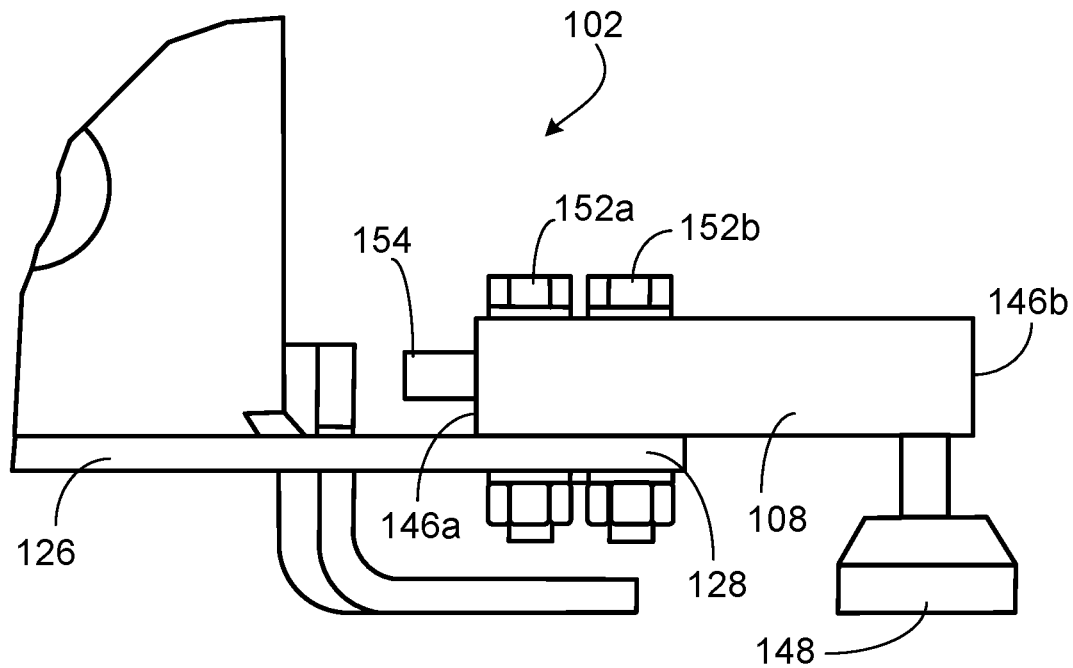
Figure 5C:
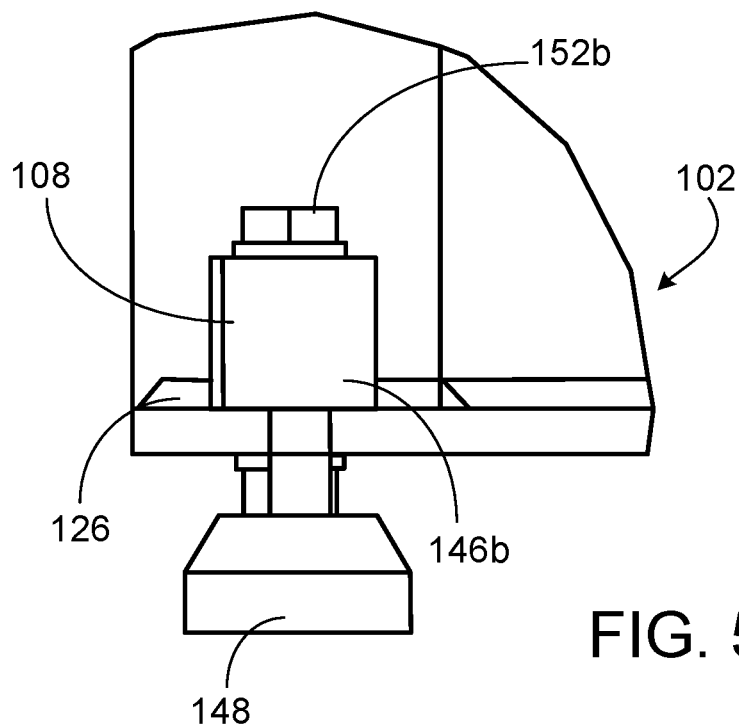

Referring to FIGS. 5A, 5B, and 5C, the baler 102 includes four scales 108; each scale 108 is rigidly secured to each of the four corners of the baler base 126. The scale 108 is responsive to a weight of the waste container, the compression ram, the amount of force being applied by the compression ram, and/or material in the waste container. The scale 108 has a first end 146a and a second end 146b and a beam body 150 extending therebetween. The first end 146a defines two through-holes configured to receive two retainers (e.g., any suitable bolt, nut, and/or screw fastener). The first end 146a extends over and is rigidly secured to the flange 128 via first and second retainers 152a, 152b. In some embodiments, the configuration of having the first end 146a of the scale 108 extend over the flange 128 can advantageously provide a user access to the first and second retainers 152a, 152b, thereby facilitating installation and/or removal of a scale 108, if necessary (e.g., if a scale fails and requires replacement). The first end 146a is configured to receive a load force (e.g., a weight of the waste container, the compression ram, the amount of force being applied by the compression ram, and/or the material in the waste container). The second end 146b is supported on a foot 148 resting on the support surface. In some embodiments, the horizontal portion of the extends laterally under the scale 108, and the foot 148 is configured to further rest on the horizontal portion of the anchor.

In some embodiments, the scale 108 is a shear beam load cell with one or more strain gauges that are positioned to measure shear in a beam-shaped cell and are connected to an appropriate electrical circuit. The strain gauges of the shear beam load cells are configured for sensing the strain caused by the stresses of shear imposed on the beam-shaped cell, thereby producing data output (e.g., readings or measurements) that is proportional to a load applied substantially perpendicular to the longitudinal direction of the beam. The shear beam load cell can measure both large and small loads, is accurate, and can be used in many different industrial weighing environments. The shear beam load cell is also low-profile, small in size, and has low sensitivity to changes in point-of-load application and to adverse side forces.

Referring back to FIG. 1A, the baling system can further include a controller 174 that further includes one or more processors. The controller 174 and the one or more processors are operatively connected to the scale 108 and configured to perform certain operations. For example, the one or more processors are configured to receive and transmit data output from the scale 108. The controller 174 can be a programmable logic controllers (PLC). In some embodiments, the baling system 100 further includes a load cell transmitter and/or a load cell amplifier that are/is operatively connected to the scale 108 and the one or more processors. In some embodiments, the load cell transmitter and/or load cell amplifier are/is configured to convert a weak signal transmitted by the scale 108 into a standard industrial process signal that can be transmitted to and received by the controller 174 and the one or more processors. The scale includes a connector 154 (e.g., one or more wires) configured to operatively connect to the controller 174, the one or more processors, and/or a power source. The data output can include the weight of the waste container, the compression ram, the amount of force being applied by the compression ram, and/or the material in the waste container.

The controller 174 is configured to record data output transmitted by the scale 108. The controller 174 further includes an interface configured to transmit the data output (e.g., weight data) to a remote location, either by wire or wirelessly. The controller 174 can include a tare function for "zeroing" a reading when the baler is empty. Alternatively or additionally, the controller 174 can record the empty baler weight as an offset to future readings.

The baling system 100 further includes a user interface (e.g., a display) configured to present the data output of the scale 108 to a user. The user interface (e.g., a display) can be configured to present data output (e.g., weight data such as the weight of a bale) such that it can be seen by the operator (e.g., to help avoid overloading of the baler during the baling process). The controller 174 can include the user interface (e.g., a display). Alternatively or additionally, the user interface can be mounted on or otherwise be connected to the baler 102. Furthermore, the user interface can be a display monitor of a computer of a network (e.g., located remotely in a central office). In some examples, the display can be a display screen on or operatively connected to the baler. In some embodiments, the display is a display screen of a mobile device (e.g., a smartphone, a tablet, or the like) that is operatively connected with the baler.

The one or more processors are configured to determine, based on the data output transmitted by the scale 108 to the one or more processors, a weight of the waste container, the compression ram, the amount of force being applied by the compression ram, and/or the material in the waste container. The one or more processors can be configured to determine, based on the data output transmitted by the scale 108 to the one or more processors, a weight of only the material in the waste container. The one or more processors are configured to determine, based on the data output received from the scale 108, that the weight of the material in the waste container corresponds to a maximum bale weight. In some embodiments, the one or more processors can be configured to, based on the data output received from the scale 108, further automatically activate the compression ram to begin compressing the material to form a bale in response to the determination of the maximum bale weight. The one or more processors can be configured to determine, based on the data output received from the scale 108, the weight of a bale within the waste container (e.g., after bale formation but prior to bale ejection).

In some embodiments, the one or more processors are configured to, in response to determining a weight of a bale within the waste container, cause an indicator on the baler to indicate that a bale has been generated. The indicator can be one or more of a visual alarm, an audible alarm, an indicator light, and a notification on a display coupled (wirelessly or via wire) to the one or more processors. In some embodiments, the one the one or more processors send one or more signals (e.g., to a display such as a remote display, a display on-site, and/or a display on the vertical baler or to a remote computer) indicating a weight of the waste container, the compression ram, the amount of force being applied by the compression ram, and/or the material in the waste container.

A baling system 200 may be substantially similar in construction and function in several aspects to the baling system 100 discussed above, but can include an alternative scale instead of the scale 108 and can further include a stand. In some embodiments, the scale is an S-type load cell. In some embodiments, the stand can provide support and prevent any lateral and/or longitudinal movement of the scale. Such alternative configuration can provide scale stability while also facilitating easy access to each scale.

Figure 6A:
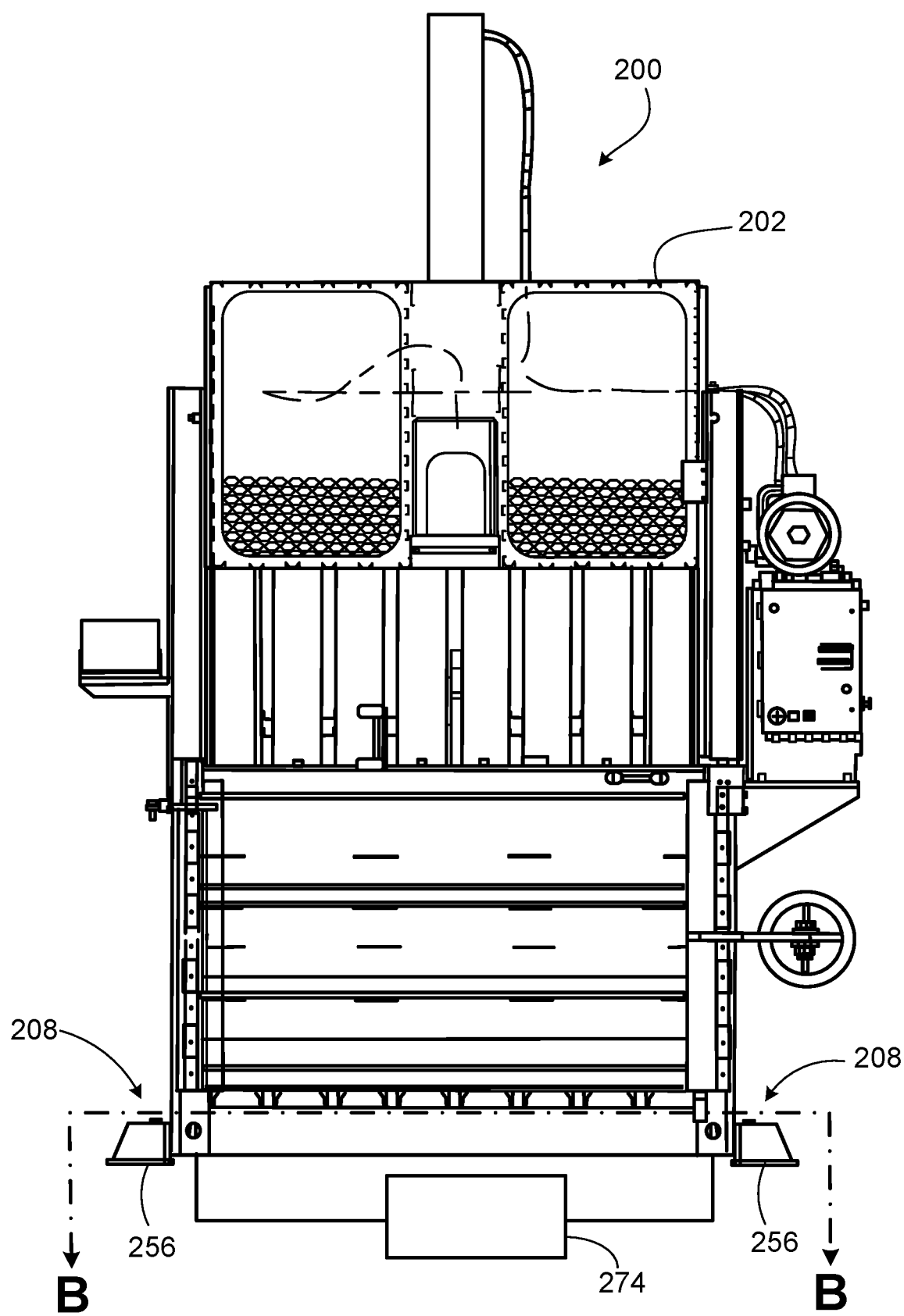
FIG. 6A is a front view of a second baling system including a baler and a scale.
Figure 6B:
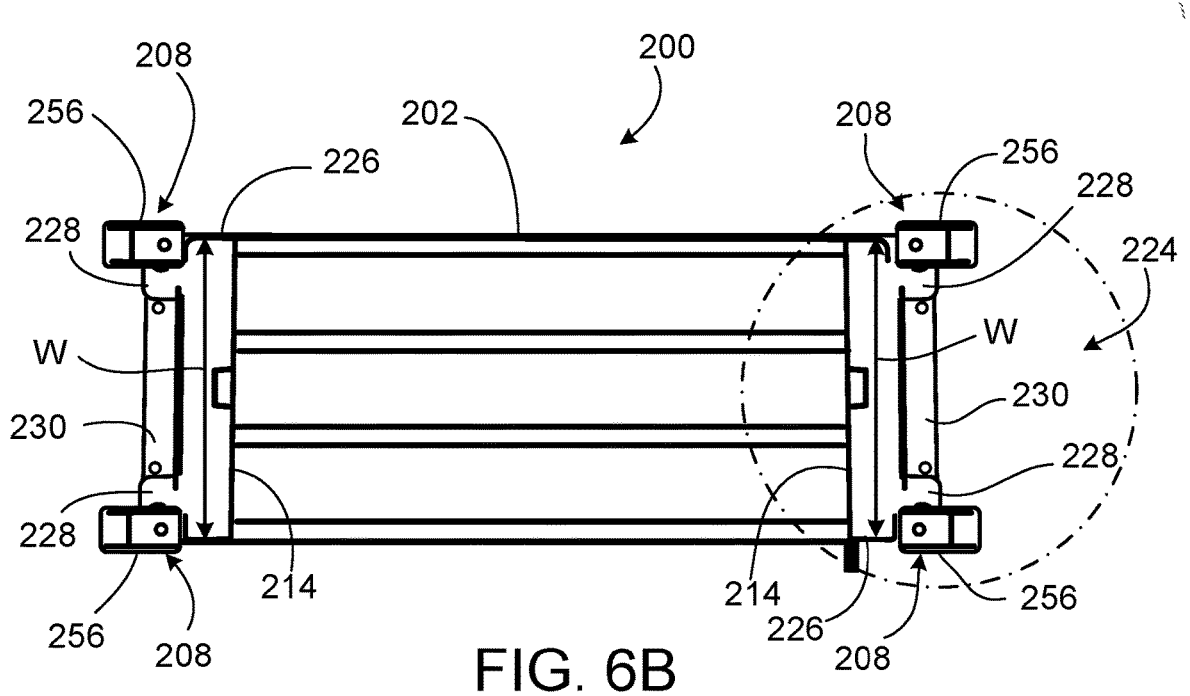
FIG. 6B is a top cross-sectional view of the baling system of FIG. 6A taken along the line B-B of FIG. 6A.
Figure 7:
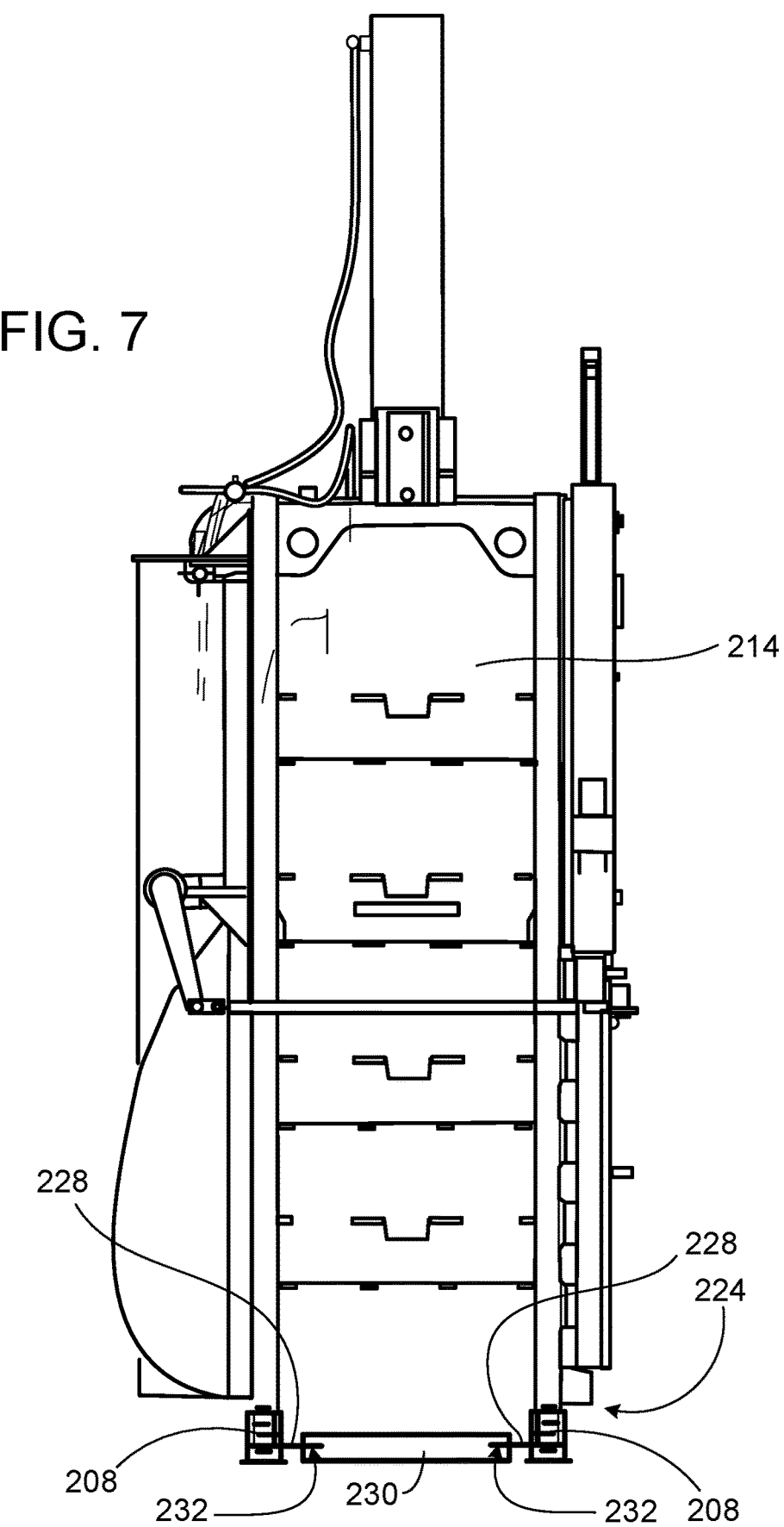
FIG. 7 is a side view of the baling system of FIGS. 6A and 6B.

FIGS. 6A-9C illustrate a baling system 200 having a scale 208 and a stand 256. Referring to FIGS. 6A, 6B, and 7, the baling system 200 includes a baler 202 (e.g., a vertical baler) and a scale 208. FIG. 6B is a top cross-sectional view of the baling system 200 through line B-B of FIG. 6A. As shown in FIG. 6B, the baler 202 includes a baler base 226 that is configured to support the baler 202. The baler base 226 extends along the width w of each side wall 214 at the second end 224 of the baler. The baler base 226 includes a laterally-extending flange 228 protruding from each corner of the baler base 226. The flange 228 is substantially rectangular in shape. Similarly to baler base 126 and flange 128, the baler base 226 and the flange 228 are typically made of one or more materials that have mechanical properties such as hardness and toughness that allow the baler base 226 and flange 228 to withstand friction, abrasion, absorb energy without fracturing and/or rupturing, and support the baler 202. Exemplary materials from which the baler base 226 and flange 228 are typically made include steel (e.g., stainless steel, abrasion-resistant steel, or the like).

Referring to FIG. 7, and also shown in FIG. 6B, the baling system 200 further includes an anchor 230 adapted to constrain movement of the baler 202 with respect to a support surface (e.g., a ground surface) on which the baler 202 rests. The anchor 230 is substantially similar in construction and function to the anchor 130. For example, the anchor 230 extends between the pair of flanges 228, along each side wall 214 on each side of the baler 202. Additionally, the anchor 230 extends between the pair of scales 208 and stands 256 on each side of the baler 202. The anchor 230 defines a recess 232 on each end of the opposing ends of the anchor 230. Thus, the anchor 230 is adapted to receive a structural feature (e.g., a portion of the flange 228) of the baler base 226 spaced laterally from the scale 208. In some embodiments, the anchor 230 can help stabilize and prevent lateral and/or longitudinal movement by engaging with an edge and/or surface of the flange 228.

Figure 8:
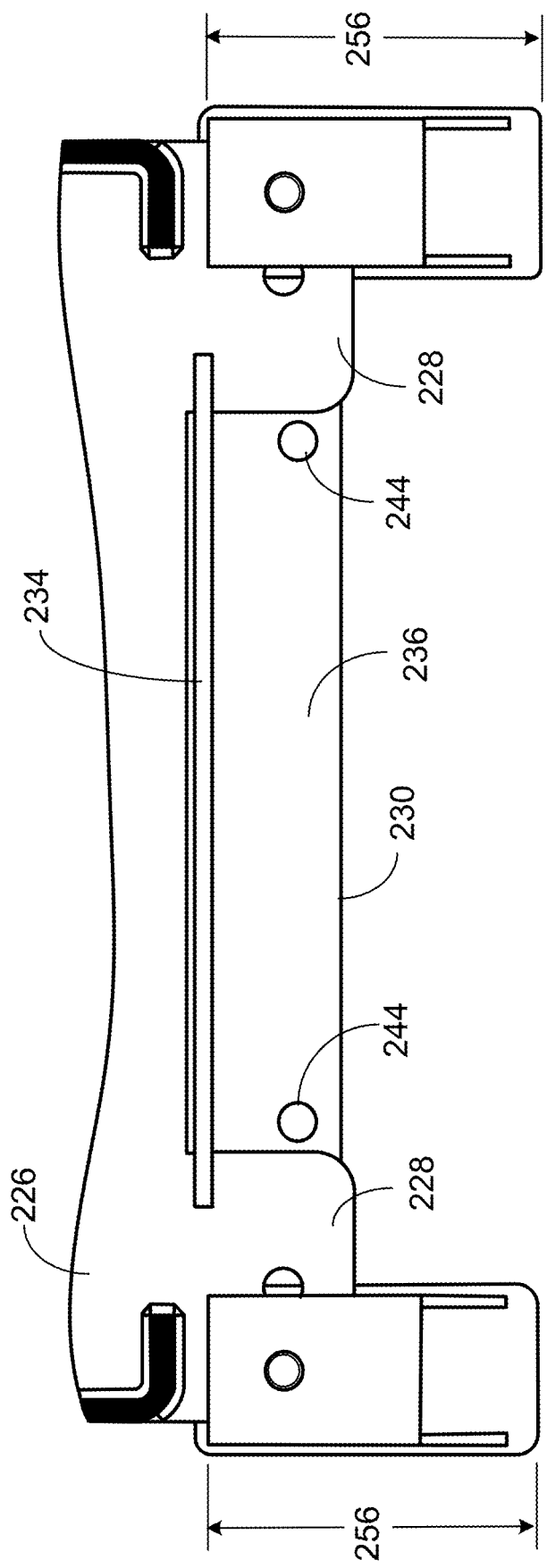
FIG. 8 is an enlarged, top partial view of a baler base of the baling system of FIGS. 6A and 6B.

Referring to FIG. 8, the anchor 230 may be substantially similar in construction and function to the anchor 130. The anchor 230 is an L-shaped plate having a vertical portion 234 and horizontal portion 236. The vertical and horizontal portions 234, 236 are positioned perpendicularly with respect to one another. The vertical and horizontal portions 234, 236 are integrally formed as a unitary component. The vertical portion 234 of the anchor 230 defines the recess 232, which is adapted to couple with the structural feature (e.g., a portion of the flange 228) of the baler base 226 in a transverse direction. In addition, the horizontal portion 236 of the anchor 230 is adapted to rest on the support surface on which the baler rests. In some embodiments, the horizontal portion 236 extends laterally under the scale 208 to provide further support and stability (e.g., to prevent any lateral movement or sliding of the scale 208) to the scale 208. The horizontal portion 236 is configured to be rigidly secured to the support surface at one or more mounting points 244. The horizontal portion 236 defines two mounting points 244 at opposing ends of the horizontal portion 236 of the anchor 230. The mounting points 244 can be through-holes configured to receive a retainer. The horizontal portion 236 can be rigidly secured to the support surface at two mounting points 244 by a retainer (e.g., any suitable bolt or screw fastener that is rigid enough to secure the anchor 230 and resist deformation).

Figure 9A:
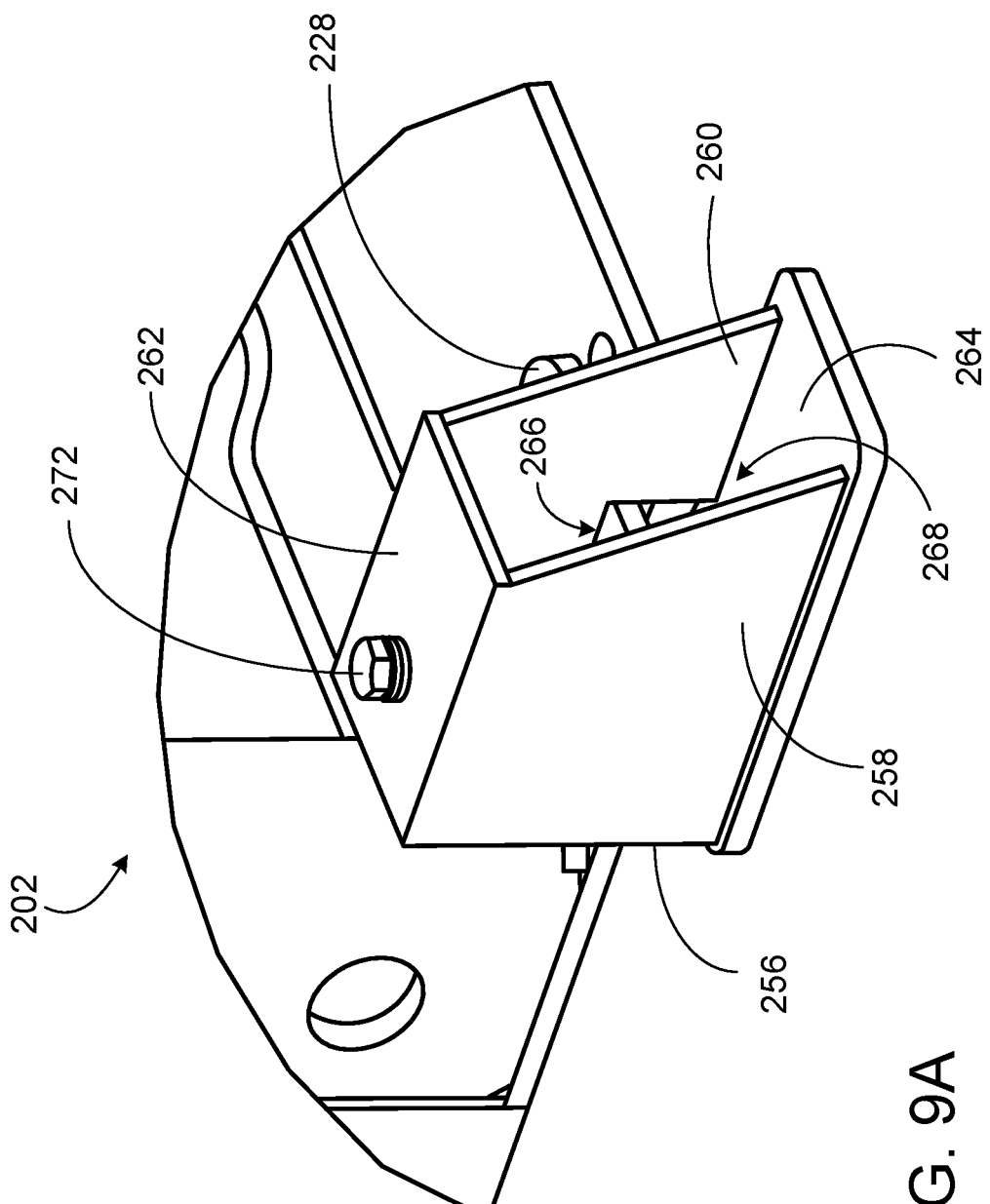
FIGS. 9A, 9B, and 9C are enlarged perspective, side, and top partial views, respectively, of a scale of the baling system of FIGS. 6A and 6B.
Figure 9B:
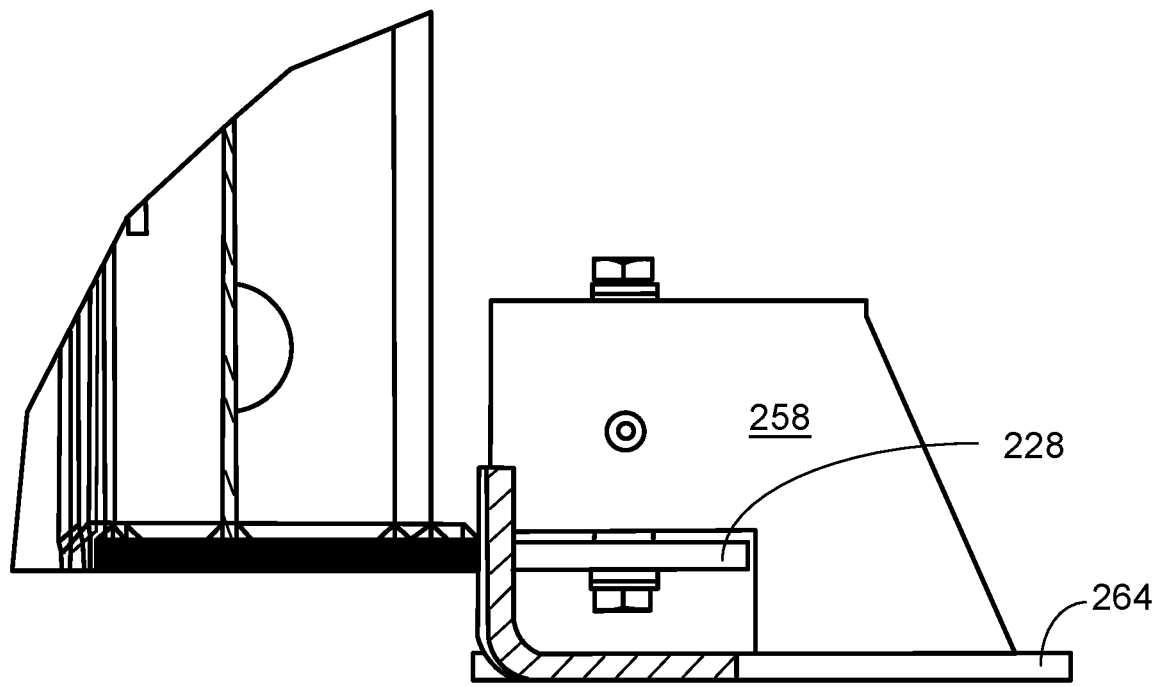
Figure 9C:
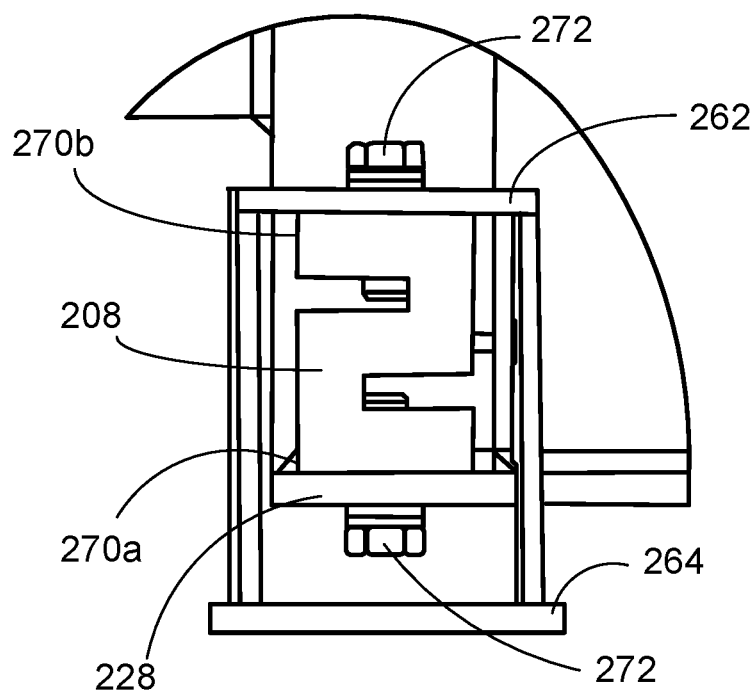

Referring to FIGS. 9A, 9B, and 9C, the baler 202 includes four stands 256; each stand 256 is positioned at each of the four corners of the baler base 226. Each stand 256 includes a pair of opposing lateral walls 258, 260, a top wall 262 extending from an upper end of one of the lateral walls 258, 260, and a base wall 264 extending from a lower end of the same lateral walls 258, 260. The opposing, upright lateral walls 258, 260 and opposing top and base walls 262, 264 together define an interior space 268. The base wall 264 is adapted to rest on the support surface on which the baler 202 rests. In some embodiments, the base wall 264 of the stand 256 is rigidly secured to the support surface on which the baler 202 rests by using one or more retainers (e.g., any suitable bolt, nut, and/or screw fastener). The flange 228 further defines a wall recess 266 adapted to receive a lateral wall 260 of the stand 256. In some embodiments, the wall recess 266 can provide further stability to the scale 208 and stand 256 by preventing and/or reducing any lateral movement or sliding of the scale 108 and stand 256.

Still referring to FIGS. 9A, 9B, and 9C, the baler 202 includes four scales 208; each scale 208 is rigidly secured to each of the four corners of the baler base 226 and to the stands 256. The scale 208 is responsive to a weight of the waste container, the compression ram, the amount of force being applied by the compression ram, and/or material in the waste container. The scale 208 has a first end 270a, mounted on and rigidly secured to the flange 228, and a second end 270b rigidly secured to a top wall 262 of the stand 256. A portion of the flange 228 and the top wall 262 each define at least one through-hole configured to receive a retainer 272 (e.g., any suitable bolt, nut, and/or screw fastener). The first end 270a and the second end 270b of the scale 208 each define a recessed hole that is configured to receive the retainers 272. Thus, the scale 208 is rigidly secured to the top wall 262 and to the flange 272 when the through-holes and recessed hole are aligned and receive retainers 272, which can then be fastened to secure the scale 208.

In some embodiments, the scale 208 is an S-type load cell, which may also be referred to as an "S-beam" cell. S-type load cells may receive their nomenclature from the "S" shape of the load cell. The S-type load cell of the disclosure can have an "S" shape design that contributes to its measuring of well-controlled tension and compression forces. Similarly to the shear beam load cells, the S-type load cell described herein can work by placing a weight or generating a force on the S-type load cell's metal spring element. The weight on the S-type load cell can cause an elastic deformation, and one or more strain gauges in the S-type load cell can be configured to measure the fractional change in length of the deformation. The S-type load cell of the disclosure can include one or more strain gauges mounted within the load cell, and can further include an indicator configured to measure the change in resistance of the strain gauges.

While the above-discussed baling systems 100, 200 have been described and illustrated with respect to certain dimensions, shapes, arrangements, configurations, and material formulations, in some embodiments, a baling system that is otherwise substantially similar in construction and function to baling systems 100, 200 may include one or more dimensions, shapes, arrangements, configurations, and/or materials formulations that are different from the ones discussed above. For example, while the scales 108, 208 of the illustrated examples feature load cells, other forms of electronic scales are envisioned. For example, the S-beam cells of system 200 may each be replaced with an extension coil spring having a first end mounted on and rigidly secured to the flange, and a second end rigidly secured to the stand, and an associated linear potentiometer configured to measure a vertical displacement between the ends of the extension coil spring in response to changes in overall system weight. Such a scale may be particularly useful in combination with a vertical displacement limit that avoids overextending the spring. Such a displacement limit may be provided by selecting an appropriate clearance gap between the baler base flange and the notch in the anchor plate. Furthermore, in addition to the shear beam load cells and S-type load cells, other types of load cells are envisioned. For example, the baling system can include a scale that includes a canister load cell, a load pin, a pancake load cell, a button load cell, a compression load cell, a tension load cell, or any combination thereof.

While a number of examples have been described for illustration purposes, the foregoing description is not intended to limit the scope of the invention, which is defined by the scope of the appended claims. For example, a baling system may have more or less scales than shown, or more or less anchor points, or a different arrangement or number of flanges. There are and will be other examples and modifications within the scope of the following claims.

What is claimed is:

1. A baling system, comprising:
a baler comprising:
a baler base with a laterally-extending flange;
a waste container adapted to hold a quantity of material to be baled;
a compression ram positioned to compress material within the waste container to form a bale; and
a scale responsive to a weight of the waste container, the ram, and material in the waste container; and
an anchor adapted to constrain movement of the baler with respect to a support surface on which the baler rests,
wherein:
the scale comprises a shear beam load cell having a first end extending over and rigidly secured to the flange, and a second end supported on a foot resting on the support surface, the shear beam load cell extending away from and orthogonal to a side wall of the baler; and
the anchor defines a recess adapted to receive a structural feature of the baler base spaced laterally from the scale.

2. The baling system of claim 1, wherein the anchor has: i) a vertical portion defining the recess and adapted to couple with the structural feature in a transverse direction, and ii) a horizontal portion that is adapted to rest on the support surface.

3. The baling system of claim 2, wherein the vertical and horizontal portions are integrally formed as a unitary component.

4. The baling system of claim 2, wherein the horizontal portion extends laterally under the scale.

5. The baling system of claim 2, wherein the horizontal portion is rigidly secured to the support surface at one or more mounting points.

6. The baling system of claim 1, wherein the anchor is an L-shaped plate.

7. The baling system of claim 1, wherein the structural feature is a portion of the flange.

8. The baling system of claim 1, further comprising a processor operatively connected to the scale and configured to receive and transmit data output from the scale.

9. The baling system of claim 8, wherein the data output is the weight of the waste container, the ram, and/or the material in the waste container.

10. The baling system of claim 8, further comprising a user interface configured to present the data output of the scale to a user.

11. The baling system of claim 1, wherein the baler is a vertical baler.

12. The baling system of claim 1, wherein the scale further comprises a second shear beam load cell extending over and rigidly secured to a second flange, and a third end supported on a foot resting on the support surface, wherein the shear beam load cell is a first shear beam load cell, and wherein the anchor extends between the first and second shear beam load cells.

13. The baling system of claim 1, wherein the shear beam load cell is rigidly secured to the flange by one or more retainers.

14. The baling system of claim 1, wherein the recess is C-shaped and is configured to receive a portion of the laterally-extending flange.

15. A baling system, comprising:
a baler comprising:
a baler base with a laterally-extending flange;
a waste container adapted to hold a quantity of material to be baled;
a compression ram positioned to compress material within the waste container to form a bale; and
a scale responsive to a weight of the waste container, the ram, and material in the waste container;
an anchor adapted to constrain movement of the baler with respect to a support surface on which the baler rests, and
a stand having a pair of opposing, lateral walls and opposing top and base walls, the base wall adapted to rest on the support surface,
wherein:
the anchor defines a recess adapted to receive a structural feature of the baler base spaced laterally from the scale; and the flange defines a wall recess adapted to receive a wall of the pair of opposing, lateral walls of the stand.

16. The baling system of claim 15, wherein the scale comprises an S-type load cell having a first end mounted on and rigidly secured to the flange, and a second end rigidly secured to the stand.

17. The baling system of claim 16, wherein the second end of the S-type load cell is rigidly secured to the top wall of the stand.

18. The baling system of claim 16, wherein the scale further comprises a second S-type load cell mounted on and rigidly secured to a second flange, and wherein the anchor extends between the first and second S-type load cells.

19. The baling system of claim 16, wherein the S-type load cell is rigidly secured to the flange and the stand via one or more retainers.

20. The baling system of claim 15, wherein the recess is C-shaped and is configured to receive a portion of the laterally-extending flange.

21. The baling system of claim 15, wherein the stand is positioned at a corner of the baler base.

\* \* \* \* \*